Jan. 8, 1963   D. A. COWHIG   3,072,170
TIRE CHAIN
Filed May 17, 1961
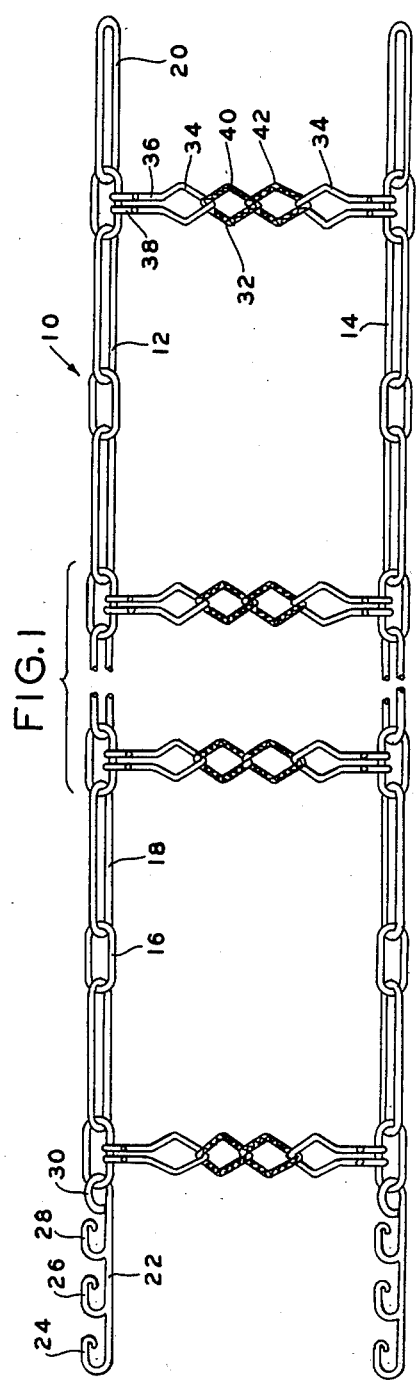
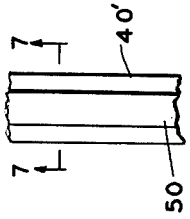
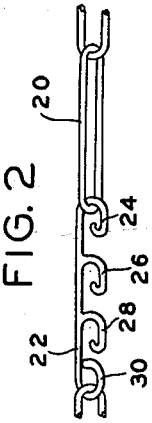
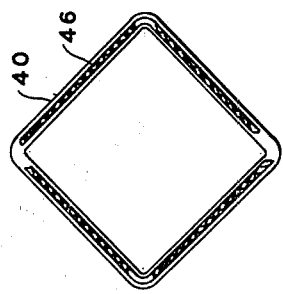
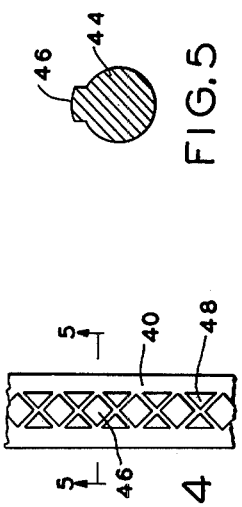
INVENTOR.
DAVID A. COWHIG
BY Arthur H. Seidel
ATTORNEY

United States Patent Office 3,072,170
Patented Jan. 8, 1963

3,072,170
TIRE CHAIN
David A. Cowhig, Sproul and Sunnyhill Roads,
Villanova, Pa.
Filed May 17, 1961, Ser. No. 110,678
2 Claims. (Cl. 152—239)

This invention relates to a tire chain having novel links which avoid twisting and provide for longer wear.

Numerous tire chains have been proposed heretofore. The tire chains proposed heretofore suffer from one or more disadvantages such as short life span, are subject to twisting, are difficult to install, etc.

The tire chain of the present invention is provided with an alternating sequence of elongated links and small interconnecting links with a minimum number of cross portions which interconnect small links. The tire chain of the present invention includes a novel latching means which can cooperate with the tire so as to be self-locking.

The cross portions of the tire chain of the present invention are provided with novel diamond-shaped links having a projection extending therefrom so as to provide a wear surface which increases the life span of the tire chain. The projections from the diamond-shaped links may be a plurality of interconnected diamonds and triangles or a rib.

It is an object of the present invention to provide a novel tire chain.

It is another object of the present invention to provide a novel tire chain having a longer life span than tire chains proposed heretofore.

It is another object of the present invention to provide a novel tire chain having a self-locking latching device.

It is another object of the present invention to provide a novel tire chain which is less susceptible to twisting.

It is still another object of the present invention to provide a novel tire chain which is easy to install and easy to remove.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a partial plan view of the tire chain of the present invention.

FIGURE 2 is a partial plan view of the interconnected ends of the tire chain shown in FIGURE 1.

FIGURE 3 is an enlarged view of a diamond-shaped link on the cross portions of the tire chain shown in FIGURE 1.

FIGURE 4 is an enlarged view of the portion of the diamond-shaped link shown in FIGURE 3.

FIGURE 5 is a transverse sectional view taken along lines 5—5 in FIGURE 4.

FIGURE 6 is an enlarged view of a portion of a diamond-shaped link in accordance with another embodiment of the present invention.

FIGURE 7 is a transverse sectional view taken along lines 7—7 in FIGURE 6.

Referring to the drawing in detail, wherein like numerals indicate like elements, there is shown in FIGURE 1 a tire chain designated generally as 10.

The tire chain 10 includes side portions 12 and 14. The side portions 12 and 14 are identical. Accordingly, only the side portion 12 will be described in detail.

The side portion 12 comprises a plurality of interconnected links 16 and 18. The links 16 are substantially smaller than the links 18. Accordingly, the side portion 12 comprises a plurality of interconnected links in an alternating sequence of small and large links 16 and 18. This sequence of links reduces twisting to a substantial extent and reduces the number of interconnecting links thereby reducing the number of connections subject to separation.

The side portion 12 is provided with a free link 20 at one end thereof. The link 20 is a large link comparable to the link 18. A latch member 22 extends from a small link at the other end of the side portion 12. The latch member 22 comprises a rodlike portion terminating at one end in an integral hook arm 24 and a closed link 30 at the other end. Intermediate the hook arm 24 and the closed link 30, the latch member 22 is provided with hook arms 26 and 28. The hook arms 24—28 are identical and have a combined length corresponding to the inner peripheral length of the link 20. Accordingly, the link 20 may be interconnected with the latch member 22 at any one of the hook arms 24, 26, and 28. As shown more clearly in FIGURE 2, the link 20 is interconnected with the hook arm 24.

When the link 20 is interconnected with the latch member 22, the same are in substantially orthogonal planes. The tire chain 10 of the present invention is intended to be used with a conventional spring operated spreader which maintains the tire chain in tension on a tire. The tension of the spreader and the engagement between the link 20 and latch member 22 with the tire causes the link 20 to twist relative to the latch member 22. Such twisting and the tension of the spreader provide a self-locking feature for the tire chain 10 of the present invention.

The side portions 12 and 14 of the tire chain 10 are interconnected at small links by side portions 32. Four such side portions 32 are illustrated in FIGURE 1. Tire chains proposed heretofore generally have ten to fourteen cross portions. The tire chain 10 of the present invention is generally provided with only seven such cross portions when utilized on the tire of a conventional automobile.

Each cross portion 32 is provided at its ends with connector links 34. Each connector link 34 is made from an elongagted piece of heavy duty wire bent so as to form a substantially diamond-shaped loop intermediate its ends with a straight portion 36 extending from the loop and terminating in a hook portion 38. The hook portions 38 extend around a small link on the side portions 12 and 14. The hook portions 38 are a closed loop and therefore interconnect the cross portion 32 with the side portions 12 and 14.

Interconnected diamond-shaped links 40 and 42 are connected to the diamond-shaped loops on the connector links 34 as shown in FIGURE 1.

A plan view of the link 40, which is identical with the link 42, is shown more clearly in FIGURE 3. As shown more clearly in FIGURE 5 illustrating an enlarged portion of the link 40, it will be seen that the link 40 is provided with integrated diamond-shaped projections 46 and triangular projections 48. The projections 46 and 48 provide a wear surface which increases the life span of the chain 10 of the present invention.

An enlarged portion of a link 40' identical with link 40 except as will be made clear hereinafter, is illustrated in FIGURE 6. The link 40' is provided with a projection 50 which is a rib as compared with the integrated projections 46 and 48.

It is believed that the operation or manner in which the tire chain of the present invention is utilized will be obvious to those skilled in the art. Accordingly, a detailed explanation is not deemed necessary. It will be obvious to those skilled in the art that the link 20 may be selectively interconnected with any one of the hook arms 24—28 so as to vary the length of the chain 10.

The projections from the diamond-shaped links together with the staggered arrangement of elongated and small links in the side portions 12 and 14 cooperate with the self-locking feature of the latch member 22 to provide a tire chain 10 which is vastly superior to those proposed heretofore.

The size relationship between the small links 16 and the large links 18 are shown in FIGURE 1. Accordingly, it will be noted that the links 18 are slightly more than twice the length of the short links 16. The width of the links 16 and 18 are identical. The length of the inner peripheral surface of the link 20 is three inches and the width of the links is one and one-eighth inches when the links are made from three-eighths inch bar stock.

The present invention may be embodied in other specific forms without departing from the spirit or essential attributes thereof and, accordingly, reference should be made to the appended claims, rather than to the foregoing specification as indicating the scope of the invention.

I claim:

1. A tire chain comprising a pair of side portions, each side portion having a plurality of interconnected links with alternating links being substantially larger than the remainder of said links, a latch member at juxtaposed ends of each side portion, an elongated link at juxtaposed ends of each side portion, a plurality of hook arms on each latch member adapted to selectively receive one of said last-mentioned links, a plurality of cross portions interconnected with said remaining links on said side portions, said cross portions being provided with links having projections thereon, said projections being wear surfaces, said projections comprising a plurality of integrated diamond-shaped projections and triangular-shaped projections.

2. A tire chain comprising a pair of side portions, each side portion having a plurality of interconnected elongated links with alternating links in each side portion being approximately twice the length of the remaining of said links, a latch member at one end of each of said side portions, a free link interconnected with the other end of said side portion, one of said free links selectively cooperating with one of said latch members to retain the side portions on a tire, a plurality of cross portions interconnected with said side portions, some of said cross portions having wear links, said wear links having a projection extending from their outer peripheral surface thereby providing a wear surface for increasing the life span of said wear links.

References Cited in the file of this patent

UNITED STATES PATENTS

| | | |
|---|---|---|
| 984,183 | Baxter | Feb. 14, 1911 |
| 1,478,420 | Baumeister | Dec. 25, 1923 |
| 1,500,875 | Jolin | July 8, 1924 |
| 2,152,883 | Eudy | Apr. 4, 1939 |
| 2,280,717 | Reyburn | Apr. 21, 1942 |

FOREIGN PATENTS

| | | |
|---|---|---|
| 941,021 | France | June 21, 1948 |